Feb. 20, 1940.  P. W. THORNHILL  2,191,359
LANDING GEAR FOR AIRCRAFT
Filed Nov. 26, 1938  3 Sheets-Sheet 1
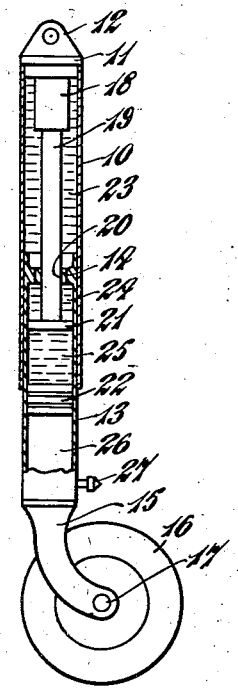
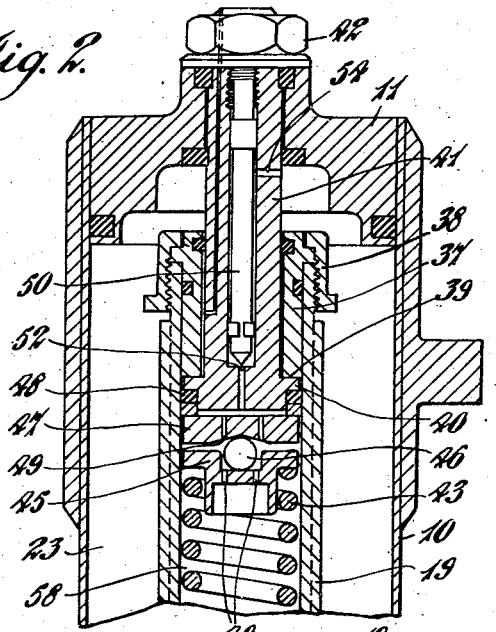
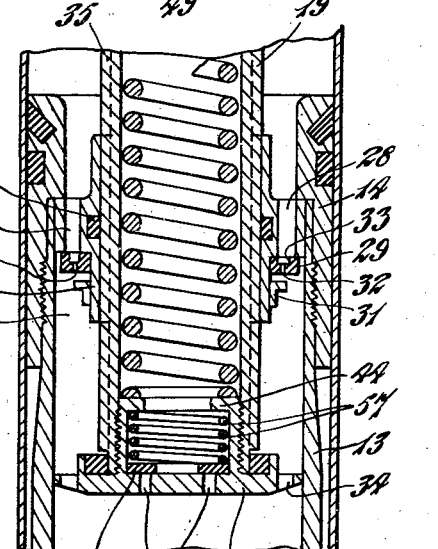
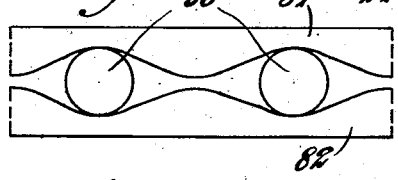
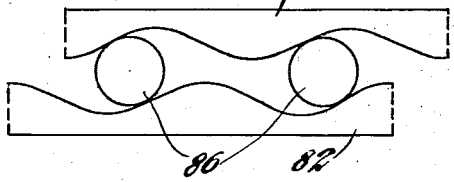
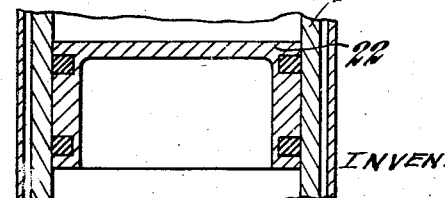
INVENTOR
P. W. THORNHILL
BY Stevens and Davis
ATTYS

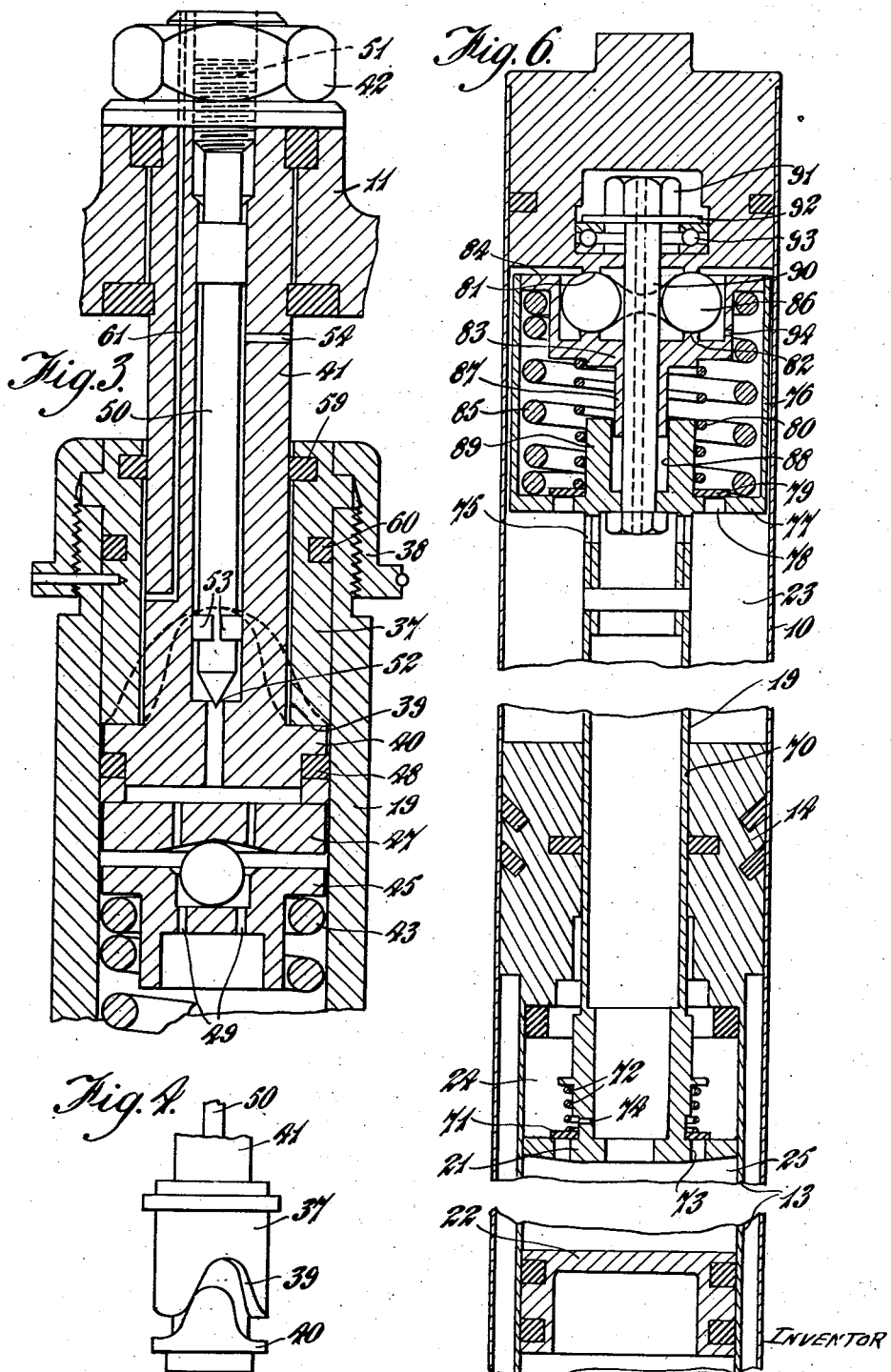

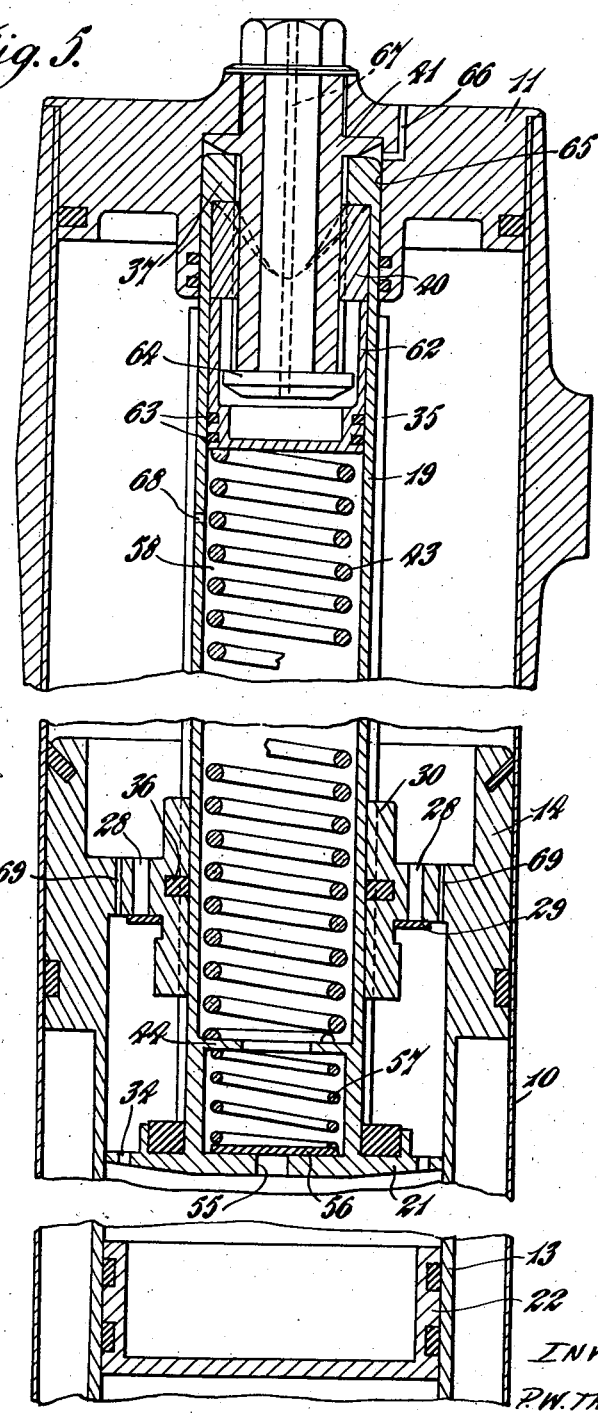

Patented Feb. 20, 1940

2,191,359

UNITED STATES PATENT OFFICE 2,191,359

LANDING GEAR FOR AIRCRAFT

Peter Warborn Thornhill, London, England, assignor to John Henry Onions, Warwickshire, England Application November 26, 1938, Serial No. 242,579
In Great Britain November 30, 1937

13 Claims. (Cl. 244—104)

This invention relates to landing gear for aircraft, and it has for its primary object to provide an improved construction of telescopic shock-absorbing fitment which is adapted to allow a wheel or other ground contacting element to have a castoring action, means being provided in the fitment for urging the wheel or equivalent towards a predetermined position, usually in line or parallel with the longitudinal axis of the aircraft. The principal use for the invention at the present time is in the mounting of tail wheels, but it may be otherwise employed, as for example in the means carrying the front wheel of an undercarriage of the tricycle type.

In an aircraft shock absorber comprising a pair of tubular members arranged to move relatively in both a telescopic sense and also rotationally about their common axis, one of said members being urged by resilient centering means towards a predetermined angular position relative to the other member, the present invention is characterised by the fact that rotational movement of the one member away from said position is opposed by a liquid damping medium. Thus, an aircraft shock absorber according to the invention may comprise a pair of tubular members arranged to move relatively in both a telescopic sense and also rotationally about their common axis, resilient means to resist shortening telescopic movement of the shock absorber, a piston which displaces the liquid from a working space as the two members are moved in a rotational sense away from a predetermined angular position one relative to the other, and damping means acting to restrict the flow of liquid from said working space and thus to damp the rotational movement away from said angular position. Further, in accordance with the invention an aircraft shock absorber comprises in combination a cylinder tube, a plunger tube sliding therein, a stem which is non-rotatable but axially slidable relative to the plunger tube, centering means comprising a pair of cam elements which are urged together in an axial direction by resilient means for causing the stem and the plunger tube to move angularly to a predetermined position relative to the cylinder, and a piston which displaces liquid from a working space during angular movement of the plunger tube and stem in a direction away from said position, thereby damping movement in said direction, the stem conveniently being tubular so that its interior constitutes the working space for producing the damping of the angular movement.

That end of the stem disposed within the plunger tube may be formed with a disc, the periphery of which fits slidably in the plunger tube and which has one or more perforations serving to damp the axial movement of the plunger tube by restricting the flow of liquid within said tube. For centering the plunger tube in its angular movement a pair of mating cam elements are preferably provided, said elements being mounted non-rotatably in relation to the cylinder tube and plunger tube respectively, and conveniently being urged into axial contact either completely or in part by means of the liquid pressure existing within the shock absorber. The damping means for opposing the angular movement of the plunger tube away from its predetermined position preferably comprises a piston which is moved in a cylinder full of liquid as the centering means are rotated in a direction away from their predetermined position, a flutter valve being arranged to close and compel the liquid in the cylinder to escape through a relatively restricted passageway, whereas during angular movement of the centering means towards the predetermined position the flutter valve opens and permits the piston to move freely.

Examples of shock-absorbing struts according to the invention are shown in the accompanying diagrammatic drawings, in which:

Figure 1 is a fragmentary sectional elevation to a small scale for illustrating the general arrangement of the preferred form of shock absorber;

Figure 2 is a fragmentary sectional elevation showing one form of internal construction;

Figure 3 is a fragmentary sectional elevation to an enlarged scale showing the construction of the centering means in Figure 2;

Figure 4 is a fragmentary outside elevation of the said centering means;

Figure 5 is a fragmentary sectional elevation showing the internal arrangement of a modified form of shock absorber;

Figure 6 is a similar view showing a still further arrangement; and

Figures 7 and 8 are diagrams to show the action of the centering means embodied in Figure 6.

The shock absorber shown in Figure 1 comprises a cylinder tube 10 which is closed at its upper end by a plug 11 having one or more perforated lugs 12 by which the cylinder tube 10 is secured firmly to an aircraft. A plunger tube 13 which at its upper end carries a piston head 14 is slidably mounted within the cylinder tube 10 and is arranged to have in addition to a vertical telescoping movement, an angular movement about the common axis of the cylinder tube 10 and the plunger tube 13. The lower end of the plunger tube is also closed and carries a fork member 15, between the limbs of which a landing wheel 16 is pivotally mounted upon an axle 17. Centering means which are indicated at 18 operate between the plug 11 of the cylinder tube and a stem 19, the lower part at least of which is of square or other non-circular cross-section and passes slidably through a similarly shaped hole 20 formed in the plunger head 14 so that rotational movement of the plunger 13 is imparted to the stem 19, although the latter does not partake of the axial movement of the plunger tube 13. At its lower end the stem 19 is formed with a radial disc 21 which fits slidably within the plunger tube 13 while the latter carries a freely movable partition piston 22. The cylinder tube 10 and the plunger tube 13 thus provide a totally enclosed working space which is divided into four compartments indicated at 23, 24, 25 and 26 respectively, the first three of these compartments being completely filled with damping liquid such as oil, while the compartment 26 is charged with compressed air or other gas pumped in through a non-return valve 27. This gas constitutes the resilient element of the shock absorber, since upward movement of the plunger tube 13 relative to the cylinder tube 10 causes the total internal space within the tubes 10 and 13 to be reduced. As the oil or other liquid is substantially incompressible it becomes forced through passages in the piston head 14 and in the disc 21, said liquid thus forcing down the partition piston 22 relative to the plunger tube 13 and bringing about further compression of the gas within the compartment 26. A flutter valve which will hereinafter be explained more fully is fitted in the piston head 20 and is arranged to close during the extension of the shock absorber, thus compelling the liquid from the compartments 24 and 25 to pass through very restricted passageways in order that the rebound movement of the shock absorber may be considerably damped.

The internal arrangement of the preferred construction of shock absorber is shown more clearly in Figures 2, 3 and 4, from which it will be seen that the piston head 14 upon the plunger tube 13 is formed with a circumferential series of passageways 28 adapted to be controlled by an annular flutter valve member 29 slidable freely upon a sleeve 30 forming the interior of the piston head 14. The axial movement of the valve member 29 is limited by a radial flange 31 adapted to allow the valve member 29 to fall clear of the passageways 28 during upward movement of the plunger tube 13. During the rebound movement however, the upward rush of liquid from the compartment 24 lifts the valve member 29 so that it covers the passageways 28, thus compelling the liquid to flow through small holes 32 extending from the lower surface of the valve member 29 to an annular groove 33 formed in its upper surface.

The disc 21 is formed adjacent its periphery with a series of apertures 34 which also have a restricting influence upon the flow of liquid, and the stem 19 by which said disc is carried is tubular in form, its external surface being shaped with splines 35 adapted to slide axially but non-rotatably within the sleeve 30 of the piston head 14, leakage of liquid being prevented by means of a suitably shaped rubber packing washer 36. At its upper end the stem 19 is fitted with a tubular cam element 37 which is held in position by means of a cap 38 and has its lower end surface 39 shaped in an undulating manner as will be seen most clearly from Figures 3 and 4. The cam element 37 is arranged to mate with a corresponding upwardly directed cam element 40 which is formed upon a cylindrical auxiliary stem 41 firmly secured at its upper end to the plug 11 in the cylinder tube 10 by means of a nut 42. The upper and lower cam elements 37 and 40 are drawn axially into engagement by a coiled compression spring 43 disposed within the stem 19, said spring at its lower end taking abutment upon an inward flange 44, while its upper end engages a bush 45 adapted to pivot freely upon a hard steel ball 46. The latter in turn bears upon a plate 47 adapted to impart the axial pressure of the spring 43 to a rubber packing washer 48 fitted below the cam element 40 and adapted to form a liquid-tight seal between the latter and the interior of the stem 19. The slope of the undulating surfaces of the cam elements 37 and 40 is such that said elements always tend to rotate relatively towards their fully engaged position so that a centering action is imparted to the stem 19 and consequently to the plunger tube 13 and wheel 16, on account of the axial force exerted by the spring 43.

In the improved arrangement of strut, liquid damping is utilised to control or modify these angular movements, and for this purpose the bush 45 and the plate 47 are perforated at 49 to allow the passage of liquid past them, and the auxiliary stem 41 is fitted internally with a pointed needle valve 50 which is capable of being adjusted from the exterior of the shock absorber by means of a grub screw head 51 so as to provide a variable constriction 52 at the base of the auxiliary stem 41. The needle valve 50 is guided at its lower end by means of projections 53, and the liquid which passes the constriction 52 is enabled to return to the compartment 23 by way of a radial passage 54 formed in the auxiliary stem 41. The disc 21 at the lower end of the stem 19 is drilled with a circular series of holes 55 which are adapted to be completely closed by an annular valve member 56 urged downwardly under the action of a coiled compression spring 57 bearing against the under surface of the flange 44.

When the wheel 16 and plunger tube 13 move angularly away from their predetermined central position the rotational movement is imparted to the stem 19, which latter is thus caused to move upwardly owing to the shape of the cam elements 37 and 40. The cam element 40 thus acts as a piston within the cylindrical interior space 58 of the stem 19 and causes liquid to be expelled from this space. As the valve member 56 is closed the only escape is past the constricted passage 52 at the point of the needle valve 50 so that the liquid can only escape slowly and a damping or dashpot effect is produced which can be readily adjusted by altering the setting of the needle valve. When the plunger tube 13 returns to or moves towards its predetermined central position the liquid space 58 becomes enlarged, but liquid is then easily drawn in past the valve member 56 so that there is no substantial damping during this movement.

In the arrangement shown in Figures 2 and 3, provision is made whereby the cam elements 37 and 40 are urged together by the pressure of the liquid in the compartment 23 in addition to the force of the spring 43, and for this purpose packing washers 59 and 60 are fitted between the cam element 37 and the parts 41 and 19 as shown. A passageway 61 places the undulating surface 39 of the cam element 37 into communication with the atmosphere, thus enabling the liquid pressure within the compartment 23 to act upon the upper end of said cam element 37 and force it downwardly to augment the action of the spring 43.

A somewhat modified construction of shock absorber which has substantially the same effect is shown in Figure 5. The stem 19 is again formed with splines 35 which render it axially slidable but non-rotatable in relation to the piston head 14. Its interior is cylindrical and accommodates a coiled compression spring 43 which as before bears against an inward flange 44 adjacent the lower end of said stem, a valve member 56 in the form of a plate pressed downwardly by a spring 57 being adapted to close a single opening 55 at the centre of the disc 21. At its upper end however the stem 19 is fitted with a cup-shaped piston 62 having packing rings 63 and is acted upon by the spring 43, the upper rim of said piston being in engagement with the lower cam element 40. This cam element is slidable axially upon the auxiliary stem 41 but is prevented from rotating by the provision of longitudinal splines, a head 64 being formed upon the lower end of the auxiliary stem for the purpose of limiting the downward movement of the cam element 40 and consequently the extension of the shock absorber. The upper cam element is indicated at 37 and is as before rigidly connected with the stem 19. At its upper end the stem 19 is circular externally and is arranged to slide within a bore 65 formed in the end plug 11 of the cylinder tube, the space within said bore being connected with the atmosphere by a passageway 66 while the space enclosed by the piston 62 is similarly in communication with the atmosphere by a passage 67 extending through the auxiliary stem 41. A hole 68 having a relatively small cross-sectional area serves to limit the rate at which liquid can be expelled from the space 58 during angular movement of the plunger tube 13 away from its predetermined or centralized position, such rotation causing the cam element 40 to be forced downwardly in company with the piston 62. During this movement the valve member 56 is closed so that the only path for the liquid to take is through the hole 68. When the plunger tube 13 twists towards its central position no substantial resistance is offered, since liquid can freely return to the space 58 within the stem 19 by way of the opening 55. The flutter valve member 29 on the piston head 14 is in this case constituted by a ring which serves to cover completely the holes 28, the constricted passages for the flow of fluid during the rebound stroke being formed separately as indicated at 69.

The construction shown in Figure 6 utilises the interior of the stem 19 as the means of communication between the chamber 23 and the chamber 25. The stem in this case comprises a square tube which fits slidably within a correspondingly shaped hole 70 in the piston head 14, and is formed as before at its lower end with a disc 21 fitting slidably within the plunger tube 13. The disc is in this instance provided with an annular flutter valve member 71 which is pressed downwardly by a spring 72 so as to cover a series of holes 73 in the disc 21 during the extending movement of the shock absorber, thus causing liquid disposed within the compartment 24 to be expelled at a relatively slow rate through a small hole 74 in the stem 19. At its upper end the stem is bored with holes 75 which allow the free passage of liquid to and from the compartment 23 and said stem is also formed with a substantially cylindrical cup member 76, the bottom 77 of which has a number of holes 78 adapted to be closed by an annular valve member 79 which is forced downwardly by a spring 80.

To bring about the centralizing movement of the plunger tube 13 an upper cam element 81 is secured rigidly to the plug 11 of the cylinder tube 15 and is of undulating shape, its developed profile being shown in Figure 7. A lower cam element 82 is constituted by an annular rib formed upon a secondary piston member 83, the rim portion 84 of which is offset upwardly as shown in Figure 6 so as to provide room for a strong coiled compression spring 85. The lower cam element 82 is also of undulating form but does not actually mate with the cam element 81 since a pair of balls 86 are interposed with a view to reducing friction. The lower part of the secondary piston member 83 is formed with a diametral tongue 87 which engages slidably with a corresponding diametral groove 88 in a boss 89 projecting upwardly from the bottom 77 of the cup member 76 so that axial sliding of the secondary piston member 83 relative to the stem 19 is permitted without allowing relative rotation. The stem 19 and the cup member 76 are located axially with respect to the cylinder 10 by means of a tubular bolt 90, the nut 91 at the upper end of which has a washer 92 abutting against a ball thrust bearing indicated at 93 and seated upon the plug member 11.

In the position shown in Figures 6 and 7 the plunger tube 13 is in its centralized position and the spring 85 is extended as far as possible. When, however, the plunger tube 13 is turned away from its centralized position the stem 19, the cup member 76 and the secondary piston member 83 are all rotated, thus causing the balls 86 to force downwardly the secondary piston member 83 against the action of the spring 85. During this movement, however, liquid damping is effected as the annular valve 79 is closed and the only escape for the liquid trapped within the cup member 76 is through a small opening 94 in the secondary piston member 83, the liquid from thence passing between the cup member 76 and the cylinder tube 10 of the compartment 23. The position then occupied by the cam elements 81 and 82 is shown in Figure 8, and it will be apparent that the upward force exerted by the spring 85 tending to press the cam elements 81 and 82 together will have the effect of rotating the cam element 82 back to the position shown in Figure 7, thus centralizing the plunger tube 13 and the wheel 16. During this return movement, of course, the valve 79 is free to open in order to readmit liquid into the interior of the cup member 76.

The liquid or other fluid damping of the angular movements of a shock absorber fitted to a castoring landing wheel or the equivalent may, of course, be obtained in many ways other than those illustrated, and in some cases it may be desirable to arrange for movements towards as well as away from the predetermined centered position to be so damped. Further, fluid damping means may be employed in shock absorbers having one or more helical springs as the main resilient element.

I claim:

1. An aircraft shock absorber comprising a pair of tubular members arranged to move relatively in both a telescopic sense and also rotationally about their common axis, resilient means to resist shortening telescopic movement of the shock absorber, a piston which displaces liquid from a working space as the two members are moved in a rotational sense away from a predetermined angular position one relative to the other irrespective of the extent to which the shock absorber is axially loaded, and damping means acting to restrict the flow of liquid from said working space, and thus to damp the rotational movement away from said angular position also irrespective of the extent to which the shock absorber is axially loaded.

2. An aircraft shock absorber comprising in combination a cylinder tube, a plunger tube sliding therein, a stem which is non-rotatable but axially slidable relative to the plunger tube, centering means comprising a pair of cam elements which are nonrotatably connected with the cylinder tube and the stem respectively and are urged together in an axial direction by resilient means irrespective of the axial relationship of the cylinder and plunger tubes for causing the stem and the plunger tube to move angularly to a predetermined position relative to the cylinder, and a piston which displaces liquid from a working space during angular movement of the plunger tube and stem in a direction away from said predetermined position, thereby damping movement in said direction.

3. An aircraft shock absorber comprising in combination, a cylinder tube closed at its upper end, and adapted to be secured to an aircraft, a plunger tube closed at its lower end and slidable in said cylinder tube, a piston head on the upper end of the plunger tube, compressed gas within the plunger tube to provide the shock absorbing resilience, liquid therein to damp the movement of the tubes, a centering cam element non-rotatably mounted within the upper end of the cylinder tube, a mating centering cam element rotatably mounted relative to the cylinder tube and arranged to impart its rotation to the piston head on the plunger tube by means of a stem, upon which the piston head is free to slide, resilient means urging the centering cam elements into axial engagement to bring the plunger tube into a predetermined angular position, and liquid damping means which are brought into operation when the plunger tube is moved in a direction away from the said predetermined position.

4. An aircraft shock absorber comprising a pair of tubular members arranged to move relatively in both a telescopic sense and also rotationally about their common axis, resilient means to resist shortening telescopic movement of the shock absorber, a piston which displaces liquid from a working space as the two members are moved in a rotational sense away from a predetermined angular position one relative to the other irrespective of the extent to which the shock absorber is axially loaded, damping means acting to restrict the flow of liquid from said working space for damping the rotational movement away from said angular position, and a valve device for enabling liquid easily to enter the working space so as to render the damping means ineffectual during relative movement of the cylinder and piston members towards the said predetermined angular position.

5. An aircraft shock absorber comprising in combination a cylinder tube, a plunger tube sliding therein, a stem which is non-rotatable but axially slidable relative to the plunger tube, centering means comprising a pair of cam elements which are non-rotatably connected with the cylinder tube and the stem, respectively, and are urged together in an axial direction by resilient means, irrespective of the axial relationship of the cylinder and plunger tubes, for causing the stem and the plunger tube to move angularly to a predetermined position relative to the cylinder, and a piston which displaces liquid from a working space during angular movement of the plunger tube and stem in a direction away from said predetermined position, thereby damping movement in said direction, the stem being hollow so that its interior constitutes the working space for producing the damping of the angular movement.

6. An aircraft shock absorber comprising in combination, a cylinder tube closed at its upper end, and adapted to be secured to an aircraft, a plunger tube closed at its lower end and slidable in said cylinder tube, a piston head on the upper end of the plunger tube, compressed gas within the plunger tube to provide the shock absorbing resilience, liquid therein to damp the movement of the tubes, a centering cam element non-rotatably mounted within the upper end of the cylinder tube, a mating centering cam element rotatably mounted relative to the cylinder tube and arranged to impart its rotation to the piston head on the plunger tube by means of a stem, upon which the piston head is free to slide, resilient means urging the centering cam elements into axial engagement to bring the plunger tube into a predetermined angular position, and liquid damping means which are brought into operation when the plunger tube is moved in a direction away from the said predetermined position, liquid pressure in the shock absorber acting upon the centering means to create or increase the force which opposes relative angular movement of the tubes away from their centered position.

7. An aircraft shock absorber comprising in combination, a cylinder tube closed at its upper end, and adapted to be secured to an aircraft, a plunger tube closed at its lower end and slidable in said cylinder tube, a piston head on the upper end of the plunger tube, compressed gas within the plunger tube to provide the shock absorbing resilience, liquid therein to damp the movement of the tubes, a centering cam element non-rotatably mounted within the upper end of the cylinder tube, a mating centering cam element rotatably mounted relative to the cylinder tube and arranged to impart its rotation to the piston head on the plunger tube by means of a stem, upon which the piston head is free to slide, resilient means urging the centering cam elements into axial engagement to bring the plunger tube into a predetermined angular position, and liquid damping means which are brought into operation when the plunger tube is moved in a direction away from the said predetermined position, the damping means comprising a piston which is moved in a cylinder full of liquid as the centering means are rotated in a direction away from their predetermined position, and a flutter valve which is arranged to close and compel the liquid in the cylinder to escape through a relatively restricted passageway, whereas during angular movement of the centering means towards the predetermined position the flutter valve opens and permits the piston to move freely.

8. An aircraft shock absorber comprising in combination, a cylinder tube closed at its upper end, and adapted to be secured to an aircraft, a plunger tube closed at its lower end and slidable in said cylinder tube, a piston head on the upper end of the plunger tube, compressed gas within the plunger tube to provide the shock absorbing resilience, liquid therein to damp the movement of the tubes, a centering cam element non-rotatably mounted within the upper end of the cylinder tube, a mating centering cam element rotatably mounted relative to the cylinder tube and arranged to impart its rotation to the piston head on the plunger tube by means of a stem, upon which the piston head is free to slide, resilient means urging the centering cam elements into axial engagement to bring the plunger tube into a predetermined angular position, and liquid damping means which are brought into operation when the plunger tube is moved in a direction away from the said predetermined position, the damping means comprising a restricted passageway fitted with an adjustable needle valve.

9. An aircraft shock absorber comprising in combination a cylinder tube, a plunger tube sliding therein, a stem which is non-rotatable but axially slidable relative to the plunger tube, centering means comprising a pair of cam elements which are non-rotatably connected with the cylinder tube and the stem, respectively, and are urged together in an axial direction by resilient means irrespective of the axial relationship of the cylinder and plunger tubes, for causing the stem and the plunger tube to move angularly to a predetermined position relative to the cylinder, a piston which displaces liquid from a working space during angular movement of the plunger tube and stem in a direction away from said predetermined position, thereby damping movement in said direction, and a coiled compression spring disposed within the stem to urge the centering means resiliently to move towards their predetermined position.

10. An aircraft shock absorber comprising in combination a cylinder tube, a plunger tube sliding therein, a stem which is non-rotatable but axially slidable relative to the plunger tube, centering means comprising a pair of cam elements which are non-rotatably connected with the cylinder tube and the stem, respectively, and are urged together in an axial direction by resilient means irrespective of the axial relationship of the cylinder and plunger tubes, for causing the stem and the plunger tube to move angularly to a predetermined position relative to the cylinder, a piston which displaces liquid from a working space during angular movement of the plunger tube and stem in a direction away from said predetermined position, thereby damping movement in said direction, a coiled compression spring disposed within the stem to urge the centering means resiliently to move towards their predetermined position, the spring acting upon that end of the stem adjacent the plunger tube, and a ball thrust bearing between the spring and that element of the centering device which is connected with the cylinder tube.

11. An aircraft shock absorber comprising in combination a cylinder tube, a plunger tube sliding therein, a stem which is non-rotatable but axially slidable relative to the plunger tube, a centering device comprising a pair of mating cam elements, one of which is carried non-rotatably by the inner extremity of an auxiliary stem extending from the upper end wall of the cylinder tube, while the other cam element is rotatable upon said auxiliary stem and is secured to the stem which is connected with the piston head of the plunger tube, said cam elements being urged together in an axial direction by resilient means irrespective of the axial relationship of the cylinder and plunger tubes, for causing the stem and the plunger tube to move angularly to a predetermined position relative to the cylinder, and a piston which displaces liquid from a working space during angular movement of the plunger tube and stem in a direction away from said predetermined position, thereby damping movement in said direction.

12. An aircraft shock absorber comprising in combination a cylinder tube, a plunger tube sliding therein, a stem which is non-rotatable but axially slidable relative to the plunger tube, centering means comprising a pair of cam elements which are non-rotatably connected with the cylinder tube and the stem, respectively, and are urged together in an axial direction by resilient means, irrespective of the axial relationship of the cylinder and plunger tubes, for causing the stem and the plunger tube to move angularly to a predetermined position relative to the cylinder, said cam elements being urged axially into engagement and having end surfaces which are undulating in form, and a piston which displaces liquid from a working space during angular movement of the plunger tube and stem in a direction away from said predetermined position, thereby damping movement in said direction.

13. An aircraft shock absorber comprising in combination a cylinder tube, a plunger tube sliding therein, a stem which is non-rotatable but axially slidable relative to the plunger tube, centering means comprising a pair of cam elements which are non-rotatably connected with the cylinder tube and the stem, respectively, and are urged together in an axial direction by resilient means, irrespective of the axial relationship of the cylinder and plunger tubes, for causing the stem and the plunger tube to move angularly to a predetermined position relative to the cylinder, said cam elements being urged axially into engagement and having end surfaces which are undulating in form, balls interposed between the undulating surfaces of the cam elements, and a piston which displaces liquid from a working space during angular movement of the plunger tube and stem in a direction away from said predetermined position, thereby damping movement in said direction.

PETER WARBORN THORNHILL.